United States Patent [19]
Goldberg et al.

[11] Patent Number: 5,970,446
[45] Date of Patent: Oct. 19, 1999

[54] SELECTIVE NOISE/CHANNEL/CODING MODELS AND RECOGNIZERS FOR AUTOMATIC SPEECH RECOGNITION

[75] Inventors: Randy G. Goldberg, Princeton; Kenneth H. Rosen; Richard M. Sachs, both of Middletown; Joel A. Winthrop, III, Little Silver, all of N.J.

[73] Assignee: AT&T Corp, New York, N.Y.

[21] Appl. No.: 08/978,527

[22] Filed: Nov. 25, 1997

[51] Int. Cl.⁶ .................................................. G10L 7/08
[52] U.S. Cl. ........................................... 704/233; 704/235
[58] Field of Search .................................. 704/233, 231, 704/256, 255, 226, 227, 228, 270

[56] References Cited

U.S. PATENT DOCUMENTS

| | | | |
|---|---|---|---|
| 4,610,023 | 9/1986 | Noso et al. | 704/275 |
| 4,720,802 | 1/1988 | Damoulakis | 395/2.42 |
| 4,933,973 | 6/1990 | Porter | 704/233 |
| 5,148,489 | 9/1992 | Erell et al. | 704/233 |
| 5,222,190 | 6/1993 | Pawate et al. | 395/2.09 |
| 5,386,492 | 1/1995 | Wilson et al. | 704/252 |
| 5,509,104 | 4/1996 | Lee et al. | 704/256 |
| 5,617,509 | 4/1997 | Kushner et al. | 704/256 |
| 5,649,055 | 7/1997 | Gupta et al. | 704/233 |
| 5,649,057 | 7/1997 | Lee et al. | 204/256 |
| 5,721,808 | 2/1998 | Minami et al. | 704/256 |
| 5,749,067 | 5/1998 | Barrett | 704/233 |
| 5,749,068 | 5/1998 | Suzuki | 704/233 |
| 5,761,639 | 6/1998 | Takebayashi et al. | 704/253 |
| 5,854,999 | 12/1998 | Hirayama | 704/233 |
| 5,860,062 | 1/1999 | Taniguchi et al. | 704/233 |

OTHER PUBLICATIONS

Proceedings., IEEE International Joint Symposia on Intelligence and Systems. Khn et al., "Robust speech reconition using noise rejection approach." pp. 326–335, May 1998.

ICASSP–94. 1994 IEEE International Conference on Acoustics, Speech, and Signal Processing, 1994. Kobayashi et al., "Markov model based noise modelling and its application to noisy speech recognition using dynamical features of speech" pp. II/57–II/60, Apr. 1994.

*Primary Examiner*—Richemond Dorvil

[57] ABSTRACT

An apparatus and method for the robust recognition of speech during a call in a noisy environment is presented. Specific background noise models are created to model various background noises which may interfere in the error free recognition of speech. These background noise models are then used to determine which noise characteristics a particular call has. Once a determination has been made of the background noise in any given call, speech recognition is carried out using the appropriate background noise model.

13 Claims, 4 Drawing Sheets

FIG. 4

SYSTEM INSTRUCTS CALLER TO SAY:

"NS437W"      "BOSTON"      "JULY 1ST"

SYSTEM ANALYZES RESPONSES USING BACKGROUND NOISE MODELS:

| MODEL # | RESULTS: | | |
|---|---|---|---|
| 1 | MS437V | — | JULY 1ST |
| 2 | NS437W | BOSTON | — |
| 3 | JS521V | — | — |
| 4 | NS437W | BALTIMORE | — |
| 5 | PS581W | BALTIMORE | JUNE 15 |
| ⋮ | ⋮ | ⋮ | ⋮ |
| n | NS437W | BOSTON | JULY 1ST |
| n+1 | NV536W | — | — |

SELECTIVE NOISE/CHANNEL/CODING MODELS AND RECOGNIZERS FOR AUTOMATIC SPEECH RECOGNITION

FIELD OF THE INVENTION

The present invention relates to the robust recognition of speech in noisy environments using specific noise environment models and recognizers, and more particularly, to selective noise/channel/coding models and recognizers for automatic speech recognition.

BACKGROUND INFORMATION

Many of the speech recognition applications in current use today often have difficulty properly recognizing speech in a noisy background environment. Or, if speech recognition applications work well in one noisy background environment, they may not work well in another. That is, when a speaker is speaking into a pick-up microphone/telephone with a background that is filled with extraneous noise, the speech recognition application may incorrectly recognize the speech and is thus prone to error. Thus time and effort is wasted by the speaker and the goals of the speech recognition applications are often not achieved. In telephone applications it is often necessary for a human operator to then again have the speaker repeat what has been previously spoken or attempt to decipher what has been recorded.

Thus, there has been a need for speech recognition applications to be able to correctly assess what has been spoken in a noisy background environment. U.S. Pat. No. 5,148,489, issued Sep. 15, 1992 to Erell et al., relates to the preprocessing of noisy speech to minimize the likelihood of errors. The speech is preprocessed by calculating for each vector of speech in the presence of noise an estimate of clean speech. Calculations are accomplished by what is called minimum-mean-log-spectral distance estimations using mixture models and Markov models. However, the preprocessing calculations rely on the basic assumptions that the clean speech can be modeled because the speech and noise are uncorrelated. As this basic assumption may not be true in all cases, errors may still occur.

U.S. Pat. No. 4,933,973, issued Jun. 12, 1990 to Porter, relates to the recognition of incoming speech signals in noise. Pre-stored templates of noise-free speech are modified to have the estimated spectral values of noise and the same signal-to-noise ratio as the incoming signal. Once modified, the templates are compared within a processor by a recognition algorithm. Thus recognition is dependent upon proper modification of the noise-free templates. If modification is incorrectly carried out, errors may still be present in the speech recognition.

U.S. Pat. No. 4,720,802, issued Jan. 19, 1988 to Damoulakis et al., relates to a noise compensation arrangement. Speech recognition is carried out by extracting an estimate of the background noise during unknown speech input. The noise estimate is then used to modify pre-stored noiseless speech reference signals for comparison with the unknown speech input. The comparison is accomplished by averaging values and generating sets of probability density signals. Correct recognition of the unknown speech thus relies upon the proper estimation of the background noise and proper selection of the speech reference signals. Improper estimation and selection may cause errors to occur in the speech recognition.

Thus, as can be seen, the industry has not yet provided a system of robust speech recognition which can function effectively in various noisy backgrounds.

SUMMARY OF THE INVENTION

In response to the above noted and other deficiencies, the present invention provides a method and an apparatus for robust speech recognition in various noisy environments. Thus the speech recognition system of the present invention is capable of higher performance than currently known methods in both noisy and other environments. Additionally, the present invention provides noise models, created to handle specific background noises, which can quickly be determined to relate to the background noise of a specific call.

To achieve the foregoing, and in accordance with the purposes of the present invention, as embodied and broadly described herein, the present invention is directed to the robust recognition of speech in noisy environments using specific noise environment models and recognizers. Thus models of various noise environments are created to handle specific background noises. A real-time system then analyzes the background noise of an incoming call, loads the appropriate noise model and performs the speech recognition task with the model.

The background noise models, themselves, are created for each set of background noise which may be used. Examples of the background noises to be sampled as models would be: city noise, motor vehicle noise, truck noise, airport noise, subway train noise, cellular interference noise, etc. Obviously, the models need not only be limited to simple background noise. For instance, various models may model different channel conditions, different telephone microphone characteristics, various different cellular coding techniques, Internet connections, and other noises associated with the placement of a call wherein speech recognition is to be used. Further, a complete set of sub-word models can be created for each characteristic by mixing different background noise characteristics.

Actual creation and collection of the models can be accomplished in any known manner, or any manner heretofore to be known, as long as the noise sampled can be loaded into a speech recognizer. For instance, models can be created by recording background noise and clean speech separately and later combining the two. Or, models can be created by recording speech with the various background noise environments present. Or even further, for example, the models can be created using signal processing of recorded speech to alter it as if it had been recorded in the noisy background.

Determination of which model to use is determined by the speech recognition apparatus. At the beginning of a call, a sample of the surrounding background environment from where the call is being placed is recorded. As introductory prompts, or other such messages are being played to the caller, the system analyzes the recorded background noise. Different methods of analysis may be used. Once the appropriate noise model has been chosen on the basis of the analysis, speech recognition is performed with the model. The system can also constantly monitor the speech recognition function, and if it is determined that speech recognition is not at an acceptable level, the system can replace the chosen model with another.

The present invention and its features and advantages will become more apparent from the following detailed description with reference to the accompanying drawings.

BRIEF DESCRIPTION OF THE DRAWINGS

FIG. 4 illustrates a chart of an example of the selection of an appropriate background noise model to be used in the speech recognition application, according to an embodiment of the present invention.

DETAILED DESCRIPTION

FIGS. 1 to 4 show a speech recognition apparatus and method for robust speech recognition in noisy environments according to an embodiment of the present invention. A hidden Markov model is created to model a specific background noise. When a call is placed, background noise is recorded and analyzed to determine which Markov model is most appropriate to use. Speech recognition is then carried out using the appropriately determined model. If speech recognition is not being performed at an acceptable level, the model may be replaced by another.

Figure 1:
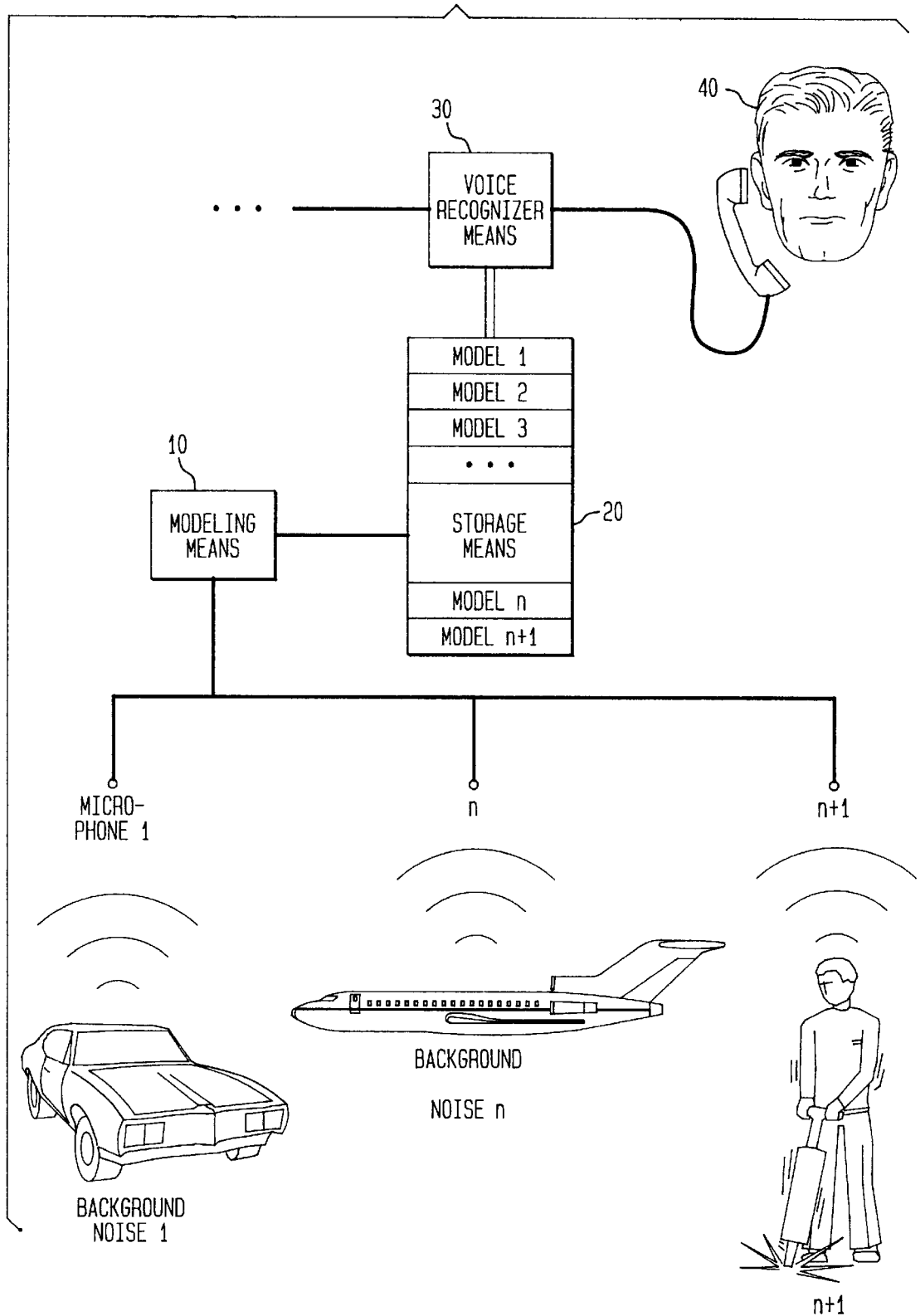
FIG. 1 illustrates a speech recognition apparatus for the creation, storage and use of various background noise models, according to an embodiment of the present invention.

Referring to FIG. 1, various background noises 1, . . . , n, n+1 are recorded using known sound collection devices, such as pick-up microphones 1, . . . , n, n+1. It is to be understood, of course, that any collection technique, whether known or heretofore to be known, may be used. The various background noises which can be recorded are sounds such as: city noise, traffic noise, airport noise, subway train noise, cellular interference noise, different channel characteristics noise, various different cellular coding techniques noise, Internet connection noise, etc. Of course, the various individual background characteristics may also be mixed in infinite variations. For example, cellular channel characteristics noise may be mixed with background traffic noise. It is to be understood, of course, that other more various background noise may also be recorded, what is to be recorded is not to be limited and that any means sufficient for the recordation and/or storage of sound may be used.

The recorded background noise is then modeled to create hidden Markov models for use in speech recognizers. Modeling is performed in the modeling device 10 using known modeling techniques. In this embodiment, the recorded background noise and pre-labeled speech data are put through algorithms which pick out phonemes creating, in essence, statistical background noise models. As described in this embodiment then, the models are thus created by recording background noise and clean speech separately and later combining the two.

Of course, it is to be recognized that any method capable of creating noises models which can be uploaded into a speech recognizer can be used in the present invention. For instance, models can be created by recording speech with the various background noise environments present. Or, for example, the models can be created using signal processing of the recorded speech to alter it as if it had been recorded in the noisy background.

The modeled background noise is then stored in an appropriate storage device 20. The storage device 20 itself may be located at a central network hub, or it may be reproduced and distributed locally. The various stored background noise models 1, . . . , n, n+1 are then appropriately accessed from the storage device 20 by a speech recognition unit 30 when a call is placed by the telephone user 40. There may, of course, be more than one speech recognition unit 30 used for any given call. Further, the present invention will work equally well with any technique of speech recognition using the background noise models.

Figure 2:
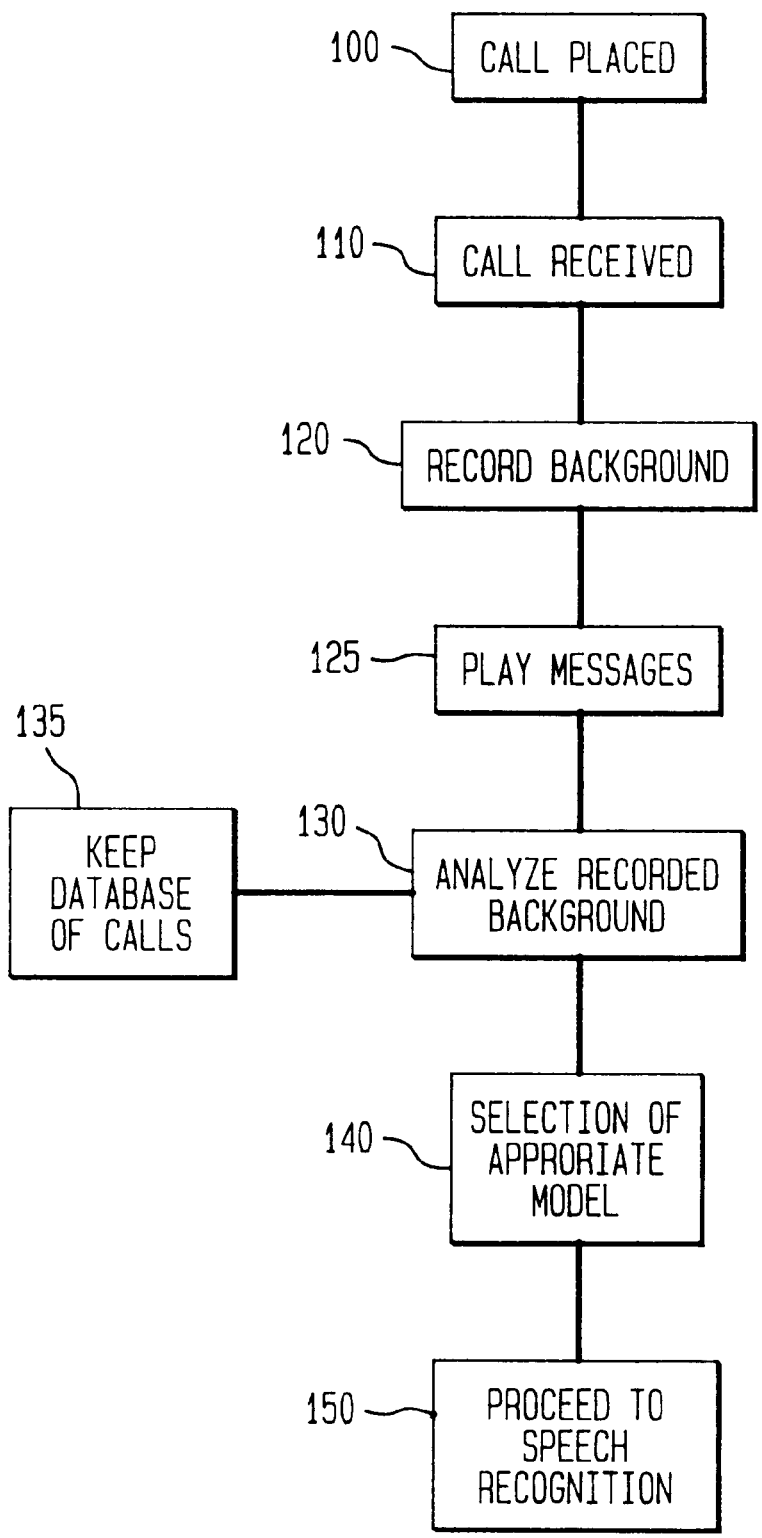
FIG. 2 illustrates a flow chart for determination of the proper noise model to use, according to an embodiment of the present invention.

Referring to FIG. 2, a call is placed by a user and received by the telephone company in steps 100 and 110, respectively. It is to be recognized, of course, that although the preferred embodiment described herein is in the context of the receipt a simple telephone call, the present invention will work equally well with any speech transmission technique used and thus is not to be limited to the one embodiment. Once the connection has been made, in step 120, approximately 2 seconds worth of background noise at the caller's location is recorded and/or monitored. Of course, various lengths of time may be used based upon adequate reception and other factors. Introductory messages, instructions or the like are then played in step 125. While these messages are being played, the background noise recorded in step 120 is analyzed by the system in step 130. Even while the messages are being played to the caller, the known technique of echoing cancellation may be used to record and/or monitor further background noise. In explanation, the system will effectively cancel out the messages being played in the recording and/or monitoring of the background noise.

Analysis of the background noise may be accomplished by one or more ways. Signal information, such as the type of signals (ANI, DNIS, SS7 signals, etc.), channel port number, or trunk line number may be used to help restrict what the background noise is, and thus what background noise model would be most suitable. For example, the system may determine that a call received over a particular trunk line number may more likely than not be from India, as that trunk line number is the designated trunk for receiving calls from India. Further, the location of the call may be recognized by the caller's account number, time the call is placed or other known information about the caller and/or the call. Such information could be used as a preliminary indicator of the existence and type of background noise.

Alternatively, or in conjunction with the preceding method, a series of questions or instructions to be posed to the caller with corresponding answers to be made by the caller may be used. These answers may then be analyzed using each model (or a pre-determined maximum number of models) to determine which models have a higher correct match percentage. For example, the system may carry on a dialog with the caller and instruct the caller to say "NS437W", "Boston", and "July 1st". The system will then analyze each response using the various background noise models. The model(s) with the correct match for each response by the caller can then be used in the speech recognition application. An illustration of the above analysis method is found in FIG. 4. As can be seen, the analysis of the first response "NS437W" is correctly matched by models 2, 4 and n. However, only models 2 and n correctly matched the second response, and only model n matched all three responses correctly. Thus model n would be chosen for the following speech recognition application.

Also, if the system is unable to definitively decide which model and/or models yield the best performance in the speech recognition application, the system may either guess, use more than one model by using more than one speech recognizer, or compare parameters of the call's recorded background noise to parameters contained in each background noise model.

Once a call from a particular location has been matched to a background noise model, the system can store that information in a database. Thus in step 135, a database of which background noise models are most successful in the proper analysis of the call's background noise can be created and stored. This database can later be accessed when another incoming call is received from the same location. For example, it has previously been determined, and stored in the database, that a call from a particular location should use the city noise background noise model in the speech recognition application, because that model results in the highest percentage of correct speech recognitions. Thus the most appropriate model is used. Of course, the system can dynamically update itself by constantly re-analyzing the call's recorded background noise to detect potential changes in the background noise environment.

Once the call's recorded background noise has been analyzed, or the database has been accessed to determine where the call is coming from and which model is most appropriate, in step 140 the most appropriate background noise model is selected and recalled from the storage means 20. Further, alternative background noise models may be ordered on a standby basis in case speech recognition fails with the selected model. With the most appropriate background noise model having been selected, and other models ordered on standby, the system proceeds in step 150 to the speech recognition application using the selected model.

Figure 3:
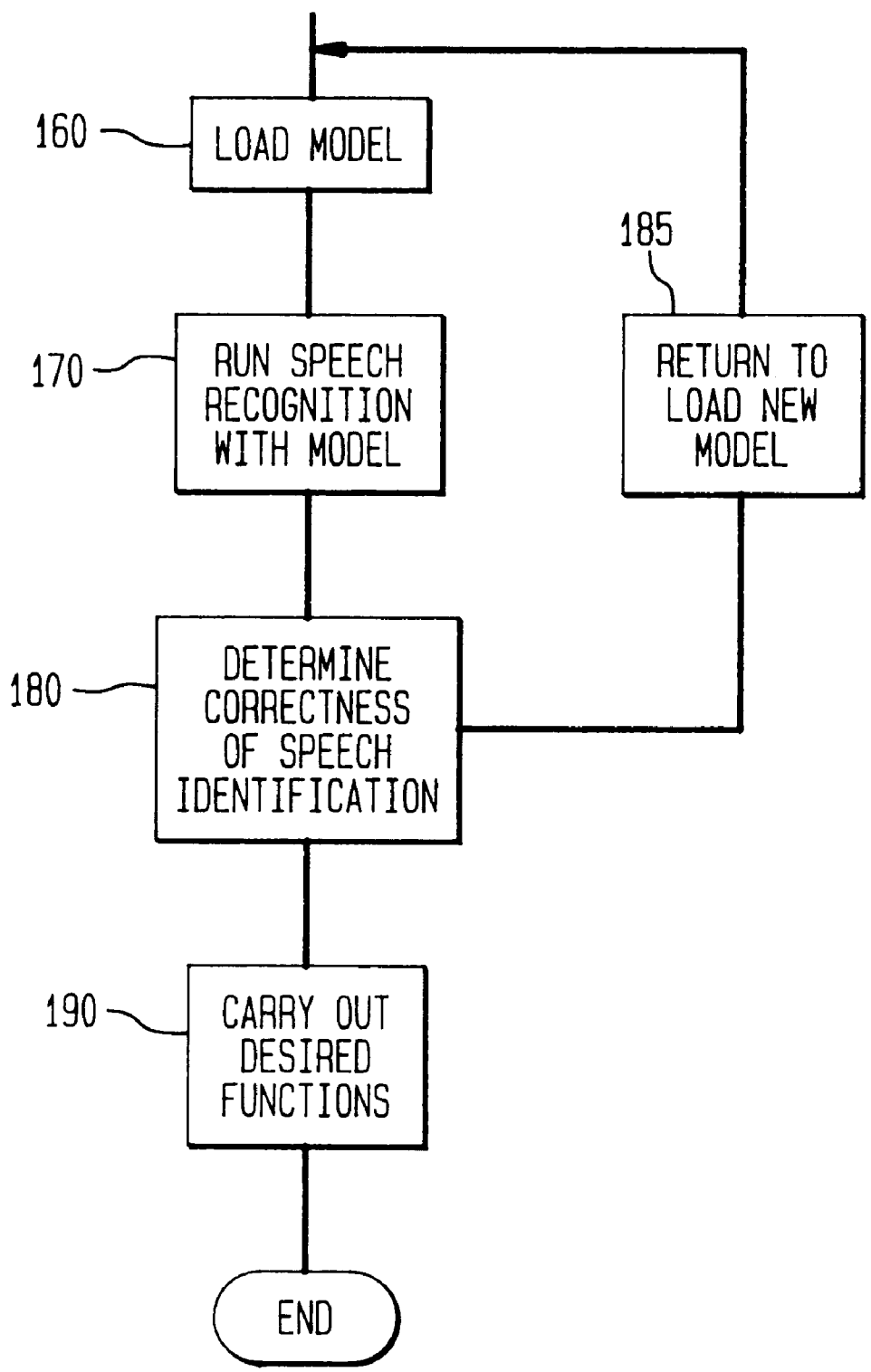
FIG. 3 illustrates a flow chart for robust speech recognition and, if necessary, model replacement, according to an embodiment of the present invention.

Referring to FIG. 3, in step 160 the selected background noise model is loaded into the speech recognition unit 30. Here speech recognition is performed using the chosen model. There is more than one method by which the speech recognition can be performed using the background noise model. The speech utterance by the caller can be routed to a preset recognizer with the specific model(s) needed, or the necessary model(s) may be loaded into the speech recognition means 30. In step 180 the correctness of the speech recognition is determined. In this manner then, constant monitoring and adjustment can take place while the call is in progress if necessary.

Correctness of the speech recognition in step 180 may be accomplished in several ways. If more than one speech recognizer means 30 is being used, the correct recognition of the speech utterance may be determined by using a voter scheme. That is, each speech recognizer unit 30, using a set of models with different background noise characteristics, will analyze the speech utterance. A vote determines what analysis is correct. For example, if fifty recognizers determine that "Boston" has been said by the caller, and twenty recognizers determine that "Baltimore" has been said, than the system determines in step 180 that "Boston" must be the correct speech utterance. Alternatively, or in conjunction with the above method, the system can ask the caller to validate the determined speech utterance. For example, the system can prompt the caller by asking "Is this correct?". A determination of correctness in step 180 can thus be made on a basis of most correct validations by the user and/or lowest rejections (rejections could be set high).

If the minimal criteria of correctness is not met, and thus the most appropriate background noise model loaded in step 160 is determined to be an unsuitable choice, a new model can be loaded. Thus in step 185, the system returns to step 160 to load a new model, perhaps the model which was previously determined in step 140 to be the next in order. The minimal criteria of correctness may be set at any level deemed appropriate and most often will be experimentally determined on the basis of each individual system and its own separate characteristics.

If the determination in step 180 is that speech recognition is proceeding at an acceptable level, then the system can proceed to carry out the caller's desired functions, as shown in step 190.

As such, the present invention has many advantageous uses. For instance, the system is able to provide robust speech recognition in a variety of noisy environments. In other words, the present invention works well over a gamut of different noisy environments and is thus easy to implement. Not only that, but the speech recognition system is capable of a higher performance and a lower error rate than current systems. Even when the error rate begins to approach an unacceptable level, the present system automatically corrects itself by switching to a different model(s).

It is to be understood and expected that variations in the principles of construction and methodology herein disclosed in an embodiment may be made by one skilled in the art and it is intended that such modifications, changes, and substitutions are to be included within the scope of the present invention.

What is claimed is:

1. A method for the robust recognition of speech in a noisy environment, comprising the steps of:
   receiving the speech;
   recording an amount of data related to the noisy environment;
   analyzing the recorded data;
   selecting at least one appropriate background noise model on the basis of the recorded data; and
   performing speech recognition with the at least one selected background noise model.

2. The method according to claim 1, further comprising the step of:
   modeling at least one background noise in a noisy environment to create at least one background noise model.

3. The method according to claim 1, further comprising the step of:
   determining the correctness of the at least one selected background noise model, wherein if the at least one selected model is determined to be incorrect, loading at least one other background noise model for use in the step of performing speech recognition.

4. The method according to claim 1, further comprising the step of:
   constructing a background noise database for use in analyzing the recorded data on the noisy environment.

5. The method according to claim 4, wherein the background noise database is dynamically updated for each location from which data is recorded.

6. The method according to claim 1, wherein the step of analyzing the recorded data is accomplished by using at least one of a plurality of signal information.

7. The method according to claim 1, wherein the step of analyzing the recorded data is accomplished by using a correct match percentage for a plurality of background noise models determined by an input response.

8. The method according to claim 1, wherein the step of performing speech recognition is accomplished by at least one recognizer.

9. A method for improving recognition of speech subjected to noise, the method comprising the steps of:
   sampling a connection noise;
   searching a database for a noise model most closely matching the sampled connection noise; and
   applying the most closely matching noise model to a speech recognition process.

10. The method according to claim 9, wherein the connection noise includes at least one of city noise, motor vehicle noise, truck noise, traffic noise, airport noise, subway train noise, cellular interference noise, channel condition noise, telephone microphone characteristics noise, cellular coding noise, and Internet connection noise.

11. The method according to claim 9, wherein the noise model is constructed by modeling at least one connection noise.

12. The method according to claim 9, wherein when a speech recognition error rate is determined to be above a predetermined level, the system substitutes the applied noise model by applying at least one other noise model.

13. The method according to claim 9, wherein at least one speech recognition unit is used.

* * * * *